Nov. 16, 1965
R. N. KNIGHTS ETAL
3,217,532
JOINTED STRUCTURES AND METHOD OF MAKING JOINTS THEREFOR
Filed July 31, 1963
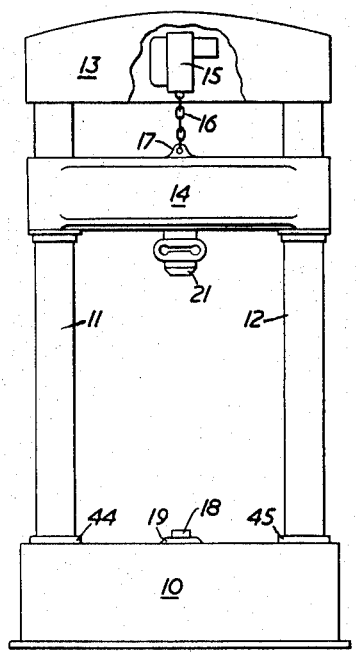
FIG./.
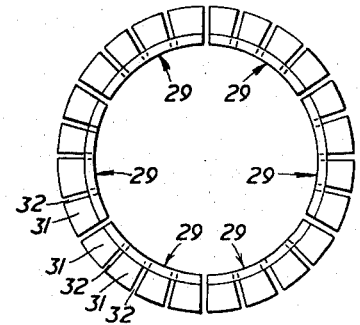
FIG.3.
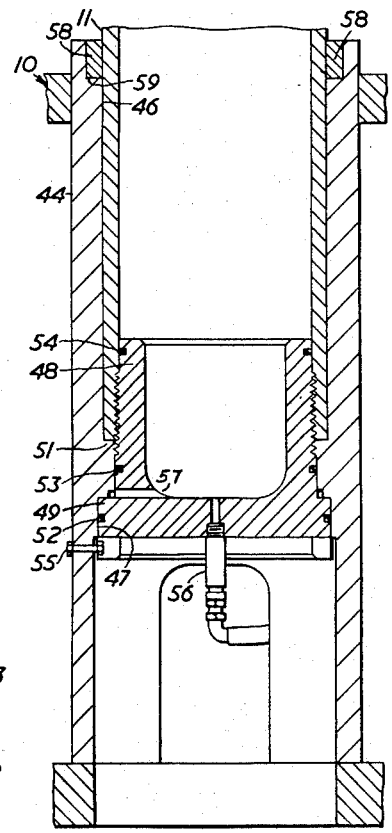
FIG.2.
FIG.4.
INVENTORS
RICHARD N. KNIGHTS &
BY ALEXANDER THARRATT
Reynolds + Christensen
ATTORNEYS United States Patent Office 3,217,532
Patented Nov. 16, 1965

3,217,532
JOINTED STRUCTURES AND METHOD OF MAKING JOINTS THEREFOR
Richard N. Knights, Gloucester, and Alexander Tharratt, Shurdington, near Cheltenham, England, assignors to Dowty Rotol Limited, Gloucester, England, a British company
Filed July 31, 1963, Ser. No. 299,018
Claims priority, application Great Britain, Aug. 16, 1962, 31,529/62
7 Claims. (Cl. 73—103)

This invention relates to a rigid joint formed between an outer member and an inner cylindrical tubular member. The invention is also concerned with structures having one or a number of such joints.

Such rigid joints according to the invention, between an outer member and a cylindrical tubular member which fits the outer member, are formed by applying fluid under pressure to the tubular member so as to expand it into rigid engagement with the outer member.

The invention is applicable to a machine structure in which it is desirable to provide for ready adjustment of a member on a tubular column, and equally readily to secure the member rigidly when so adjusted, without securing means other than the structure of the joint itself. An advantage made possible is that the said member, for example a cross beam mounted on two columns, can be readily adjusted lengthwise of the columns and yet rigidly secured in a desired position thereon without recourse either to excessive manual effort in tightening the joint or joints, or to the provision of supplementary adjusting and holding mechanism such as screw and nut mechanism.

A machine structure in accordance with the invention may comprise a base member, parallel tubular columns extending from the base member, means for initially securing the cross beam to the columns at a desired position therealong, and means for connecting the columns to a source of fluid under pressure, so that after the cross beam has been initially secured in position, fluid pressure within the columns can expand the columns into rigid engagement with the cross beam.

One embodiment of the invention is illustrated in the accompanying drawings, of which, FIGURE 1 is a front elevation of a fatigue testing machine broken away in part, FIGURE 2 is an enlarged sectional view showing the structural joint between the cross beam and one of the columns of FIGURE 1, FIGURE 3 is a view in the axial direction of the tapered collet of FIGURE 2, and, FIGURE 4 is an enlarged sectional view showing the structural joint between the machine base and one of the columns of FIGURE 1.

The machine structure in FIGURE 1 comprises a base 10 from which two parallel cylindrical tubular columns 11 and 12 are upstanding. The columns are joined at their upper ends by a head 13, while a cross beam 14 is slidably mounted on the columns 11 and 12 between the head 13 and the base 10. The cross beam 14 can be raised or lowered to a desired position by a motor driven winch 15 which is fixed behind the portion of the head 13 shown broken away in FIGURE 1. The winch 15 has a chain 16 connected to a central lug 17 on the upper side of the cross beam 14.

The adjustability of the cross beam 14 is to allow for different lengths of test specimens. A test specimen is connected between the movable element 18 of a fluid-power-operated vibrator 19 which is mounted in the base 10 and a fixed anchorage 21 which is disposed centrally in the cross beam 14.

The adjustable mounting of the cross beam 14 on the column 11 is shown in FIGURE 2, the mounting on the column 12 being similar. The end portion of the cross beam 14 comprises a housing 22 having a cylindrical bore 23 which is terminated at its upper end by an internal flange 24. A bush 25 received in the bore 23 fits against the flange 24 and is located by a dowel pin 26. The bush 25 has a tapered bore 27 receiving through its lower end an outer member formed as a collet 28 having a complemental taper.

The collet 28, viewed from the apex end of its taper in FIGURE 3, is seen to comprise six segments 29 which are spaced one from the next in the installed position. In order to provide even contact pressure so far as possible between the segments and the column, each segment 29 is partially divided into fingers 31 by longitudinal slots 32 which extend from the wide end of each segment 29 part or most of the way to the narrow end, see FIGURE 2. At the wide end of each segment 29 there is formed a circumferential groove 33 into which fits the inturned flange 35 of an adjuster ring 34. This adjuster ring is screw-threaded into a flanged ring 36 which fits an enlarged bore 37 at the mouth of the cylindrical bore 23 in the housing 22. The ring 36 has a flange 38 through which a number of bolts 39 extend into screw-threaded engagement in the socket member 22. In between the bolts 39 there are a number of socket-headed screws 42 engaged in the housing underneath the flange 38, while registering holes 43 in the flange 38 provide access for a turning tool to the heads of the screws 42.

The mounting of column 11 in the base 10 is provided by a socket member 44, the column 12 being similarly mounted in a socket member 45 at the other end of the base. The socket member 44 has in its upper portion a bore 46 receiving the column 11, and in its lower portion a counterbore 47 receiving the flanged head 49 of a piston member 48. The shank portion of the piston member slidably fits the bore of an annular step 51 which separates the bore 46 from the counterbore 47, and it is fixed in the column by a screw thread. The lower end of the column 11 and the annular step 51 constitute co-operable abutments. The piston member 48 has sealing rings 52, 53 and 54 engaging the counter bore 47, the annular step 51 and the bore of the column 11 respectively. The piston member 48 is fixed, after assembly, against turning by a bolt 55 through the socket member 44.

The interior of each column 11 and 12 is closed at its upper end, the column 12 being likewise closed at its lower end by a similar piston member to that described, while a fluid pressure connection to the sealed interior of each column is provided by a connector 56 fixed in the piston head 49. A radial passage 57 through the piston member 48 adjacent the head 49 provides a fluid pressure access to the annular surface of the piston head 49. The cylindrical column 11 has a close sliding fit within the bore 46 of the socket member 44, allowing insertion of the column without force, but after assembly a more precise fit against the column 11 is provided by a number of segmental packing pieces 58 which are inserted into an annular recess 59 in the upper end of the socket member 44 and secured by running in a low melting point alloy. In this way a sufficiently rigid mounting of the column 11 and 12 in the base 10 is assured for transportation and installation purposes, and the necessary rigidity of the entire structure during use is effected as will now be described.

The fluid pressure connector 56 is supplied from a hydraulic power system, such as that which is provided for operating the vibrator 19. If the cross beam 14 has been adjusted to the desired height by the winch 15, the adjuster ring 34 is screwed into the flanged ring 36 to force the collet 28 along the tapered bore 27 and so cause the fingers 31 of the segments 29 to grip the column 11. This may be done without excessive turning load on the adjuster ring 34. The several bolts 39, previously unscrewed so that the flange 38 is substantially spaced from the end of the housing 22, are now tightened equally whereby the flanged ring 36 shifts the adjuster ring 34 and collet 28 still further along the axis of the bore 27 to increase the grip on the column 11. The columns 11 and 12 have a wall thickness such that they will expand radially, within the limit of elastic deformation of the material, under the delivery pressure of the hydraulic power system. If now the hydraulic power system is energised and delivery pressure has access to the interior of the columns, each column will expand elastically against the collet 28 and increase the grip still further.

At the same time, the lower portion of the column 11 expands within the socket member 44 and, depending upon the extent of the initial clearance therein, it may even reduce the clearance to zero. Pressure also acts through the passage 57 upon the annular area of the flanged piston head 49. The piston 48 is therefore urged downwardly by fluid pressure, taking up any slackness in the screw-threaded joint with the column 11, and forcing the lower end of the column firmly against the annular step 51. It is arranged that the annular area of the flanged piston head 49 and the fluid pressure acting thereon shall provide a force in the two columns which exceeds anything that the movable vibrator element 18 can exert in thrust on the cross beam 14. The rigidity of the joints between the columns 11, 12 and the base 10 will therefore not be disturbed during operation of the testing machine. After fluid pressure has been applied to the hollow columns 11 and 12, a test specimen can be connected between the movable vibrator element 18 and the anchorage 21 and then subjected to alternating loads by the power operated vibrator 19.

If, after a test, it is desired to change the height of the cross beam 14, the interiors of the columns 11, 12 are returned to zero pressure. The bolts 39 are unscrewed so that their heads lie a substantial distance from the flange 38, and then the screws 42 are unscrewed by equal amounts against the flange 38 whereby the rings 36, 34 and the collet 28 are withdrawn downwardly. Further loosening of the joint may be effected by unscrewing the adjuster ring 34 in the flanged ring 36. Any downward movement of ring 34 effects downward movement of collet 28, through engagement of flange 35 within its groove 33.

It is not an essential feature of the invention that the adjuster ring 34 and the flanged ring 36 shall be separate relatively movable rings. In an alternative construction a single ring may be provided having an inturned flange such as that at 35 engaging the groove 33 and an outturned flange such as that at 38 co-operable with the bolts 39 and screws 42. All the axial shifting of the collet 28 is then effected by the bolts 39 and the screws 42.

We claim as our invention:

1. A machine structure comprising a base member, at least two resiliently expandable cylindrical tubular columns mounted in the base member to extend therefrom in parallelism, and each closed at both its ends to define a sealed enclosure, a cross beam, an outer member disposed around each tubular column and carried by the cross beam to provide a slidable mounting for the cross beam on the tubular columns, means associated with each outer member being operative to effect initial securement of said outer member to the column therein at a desired position of the cross beam along the column, and connecting means on each column arranged for connection between the interior thereof and a source of fluid under pressure which, when applied to the sealed enclosure of each column, is operative to expand the column radially against the outer member thereon, whereby the cross beam is secured rigidly on the columns.

2. A machine structure according to claim 1, wherein each outer member and the initial securement means associated therewith together comprise a collet device and adjustment means therefor, said adjustment means being operative to expand and contract the collet device for respectively providing sliding engagement and initial securement between each collet device and the column extending therethrough.

3. A machine structure according to claim 1, wherein the mounting for each tubular column in the base member comprises a socket member fixed in the base member, an abutment on each socket and an abutment on the tubular column therein, said abutments being co-operable to determine the limit of insertion of the column into the socket member, piston and cylinder means operatively interposed between each column and the socket member to define a sealed chamber which enlarges upon movement of the column into the socket member up to the point of engagement of said co-operating abutments, and connecting means arranged to establish a connection between each sealed chamber and the source of fluid under pressure.

4. A machine structure comprising a base member, at least two resiliently expansible cylindrical tubular columns mounted in the base member to extend therefrom in parallelism, means closing each end of each column, a cross beam, outer members carried by the cross beam and each surrounding a column to provide a slidable mounting for the cross beam on the columns, mechanical means intermediate each outer member and its column constrictive to effect initial securement of said outer member to the column therein at a desired location of the cross beam along the column, and expansible to free the outer member for sliding movement, and means to supply fluid under pressure to the interior of the column, to expand the column radially against the previously constricted mechanical means.

5. A structure as defined in claim 4, including a flange at one end of the bore of each outer member, and the mechanical means includes a tapered collet member surrounding and bearing upon the column, a complementally tapered bush intermediate the collet member and the bore of the outer member, and bearing at its larger end upon said flange, and means reacting from the outer member and operatively engaged with said collet member to urge it axially of the column and relative to said bush.

6. A structure as defined in claim 5, wherein the means to urge the collet member axially includes a ring surrounding the collet and slidable axially of the outer member, said ring engaging an end-facing shoulder of the collet, means threaded in the outer member and engaging said ring to urge the collet in one axial direction, further means threaded in the outer member and engageable with the ring to urge the same in the opposite axial direction, and the ring and the collet being formed with interengageable shoulders for positive withdrawal of the collet upon urging of the ring by said further means in the opposite axial direction.

7. A structure as in claim 4, wherein the mechanical means includes an inner and an outer ring threaded one within the other, the outer ring being slidably received in the bore of the outer member and the inner ring being interengageable with the collet member for axial movement of the latter by like movement of the inner ring relative to the outer ring.

References Cited by the Examiner

UNITED STATES PATENTS 2,496,667   2/1950   Hopwood   285—107
2,999,382   9/1961   McClelland   73—93

RICHARD C. QUEISSER, *Primary Examiner.*